US012647042B2

(12) United States Patent
Huang et al.

(10) Patent No.: US 12,647,042 B2
(45) Date of Patent: Jun. 2, 2026

(54) ELECTRIC CIRCUIT AND AIR CONDITIONER WITH DIRECT-CURRENT LOAD CONNECTED IN PARALLEL TO CAPACITOR IN ENERGY STORAGE MODULE

(71) Applicants: CHONGQING MIDEA AIR-CONDITIONING EQUIPMENT CO., LTD., Chongqing (CN); GD MIDEA AIR-CONDITIONING EQUIPMENT CO., LTD., Foshan (CN)

(72) Inventors: Zhaobin Huang, Chongqing (CN); Tan Long, Chongqing (CN); Ming Zhao, Chongqing (CN); Jianning Yang, Chongqing (CN); Jinqing Xu, Chongqing (CN); Xianjie Zeng, Chongqing (CN); Zhaojing Huo, Chongqing (CN); Xianshi Wen, Chongqing (CN)

(73) Assignees: CHONGQING MIDEA AIR-CONDITIONING EQUIPMENT CO., LTD., Chongqing (CN); GD MIDEA AIR-CONDITIONING EQUIPMENT CO., LTD., Foshan (CN)

( * ) Notice: Subject to any disclaimer, the term of this patent is extended or adjusted under 35 U.S.C. 154(b) by 323 days.

(21) Appl. No.: 18/016,277

(22) PCT Filed: Sep. 13, 2021

(86) PCT No.: PCT/CN2021/118018
§ 371 (c)(1),
(2) Date: Jan. 13, 2023

(87) PCT Pub. No.: WO2022/068566
PCT Pub. Date: Apr. 7, 2022

(65) Prior Publication Data
US 2023/0275525 A1 Aug. 31, 2023

(30) Foreign Application Priority Data

Sep. 30, 2020 (CN) .......................... 202011063267.7
Sep. 30, 2020 (CN) .......................... 202022223541.4

(51) Int. Cl.
*H02M 7/219* (2006.01)
*F24F 11/88* (2018.01)
(Continued)

(52) U.S. Cl.
CPC ............. *H02M 7/219* (2013.01); *F24F 11/88* (2018.01); *H02M 1/12* (2013.01); *H02M 1/4216* (2013.01)

(58) Field of Classification Search
CPC ...... H02M 7/219; H02M 1/12; H02M 1/4216; F24F 11/88
See application file for complete search history.

(56) References Cited

U.S. PATENT DOCUMENTS 11,021,069 B1 * 6/2021 Elshaer ................... B60L 50/60
2014/0043870 A1 * 2/2014 Swamy ................. H02M 5/458
363/126
(Continued)

FOREIGN PATENT DOCUMENTS

CN 203691275 U 7/2014
CN 105024532 A 11/2015
(Continued)

OTHER PUBLICATIONS

The China National Intellectual Property Administration (CNIPA) The First Office Opinion Notice for Chinese Application 202011063267.7 Aug. 6, 2024 16 Pages (With Translation).
(Continued)

*Primary Examiner* — Lakaisha Jackson
(74) *Attorney, Agent, or Firm* — Anova Law Group, PLLC

(57) ABSTRACT
An electronic circuit includes a rectifier module and an energy storage module. The rectifier module includes a
(Continued)

three-phase rectifier bridge including first, second, and third bridge arms connected in parallel to each other, and a bidirectional switch assembly including first, second, and third bidirectional switches. One ends of the first, second, and third bidirectional switches are connected to midpoints of the first, second, and third bridge arms, respectively. The energy storage module is connected to a direct-current output end of the rectifier module and includes two capacitors connected in series to each other. One of the two capacitors is connected in parallel to a direct-current load. Other ends of the first, second, and third bidirectional switches are connected between the two capacitors.

10 Claims, 10 Drawing Sheets

(51) Int. Cl.
　　H02M 1/12　　　　(2006.01)
　　H02M 1/42　　　　(2007.01)

(56)　　　　　References Cited

U.S. PATENT DOCUMENTS

| | | | | |
|---|---|---|---|---|
| 2014/0198542 | A1* | 7/2014 | Swamy | H02M 1/4225 |
| | | | | 363/126 |
| 2018/0145585 | A1* | 5/2018 | Du | H02M 1/4216 |
| 2021/0067052 | A1* | 3/2021 | Hu | H02M 5/4585 |

FOREIGN PATENT DOCUMENTS

| | | | | | |
|---|---|---|---|---|---|
| CN | 106533218 | A | | 3/2017 | |
| CN | 206077249 | U | | 4/2017 | |
| CN | 108458457 | A | | 8/2018 | |
| CN | 109245594 | A | | 1/2019 | |
| CN | 209105059 | U | | 7/2019 | |
| CN | 110521101 | A | | 11/2019 | |
| CN | 212305171 | U | | 1/2021 | |
| EP | 3672055 | A1 | * | 6/2020 | ........... H02M 7/219 |
| JP | 2019158315 | A | * | 9/2019 | |

OTHER PUBLICATIONS

The World Intellectual Property Organization (WIPO) International Search Report and Written Opinion for PCT/CN2021/118018 Nov. 26, 2021 11 Pages (including translation).

The European Patent Office (EPO) The extended European search report for 21874227.8 Dec. 5, 2023 11 Pages.

Wenlong Ding et al. "Independent voltage outputs control for VIENNA rectifier considering multiple loads situations." 2017 IEEE 3rd International Future Energy Electronics Conference and ECCE Asia (IFEEC 2017—ECCE Asia). IEEE, 2017.

* cited by examiner

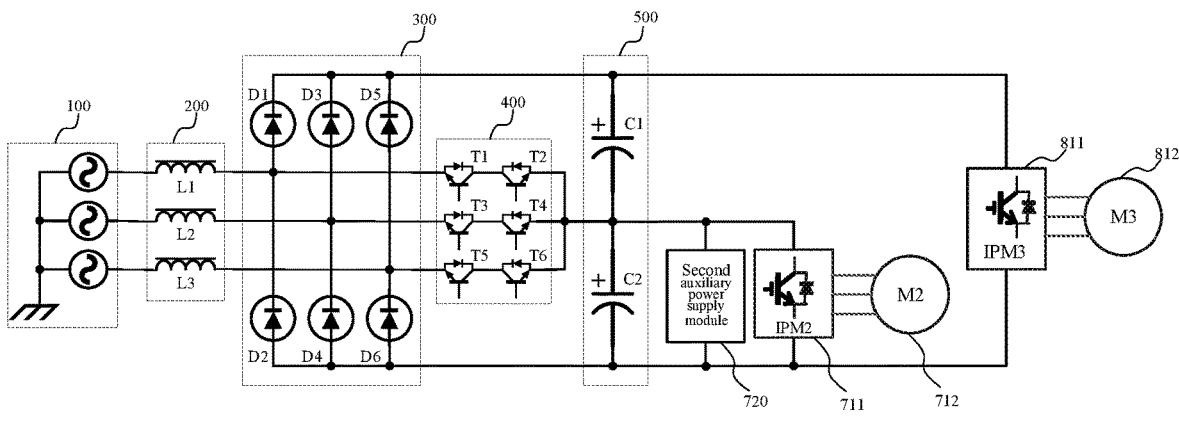
FIG. 14
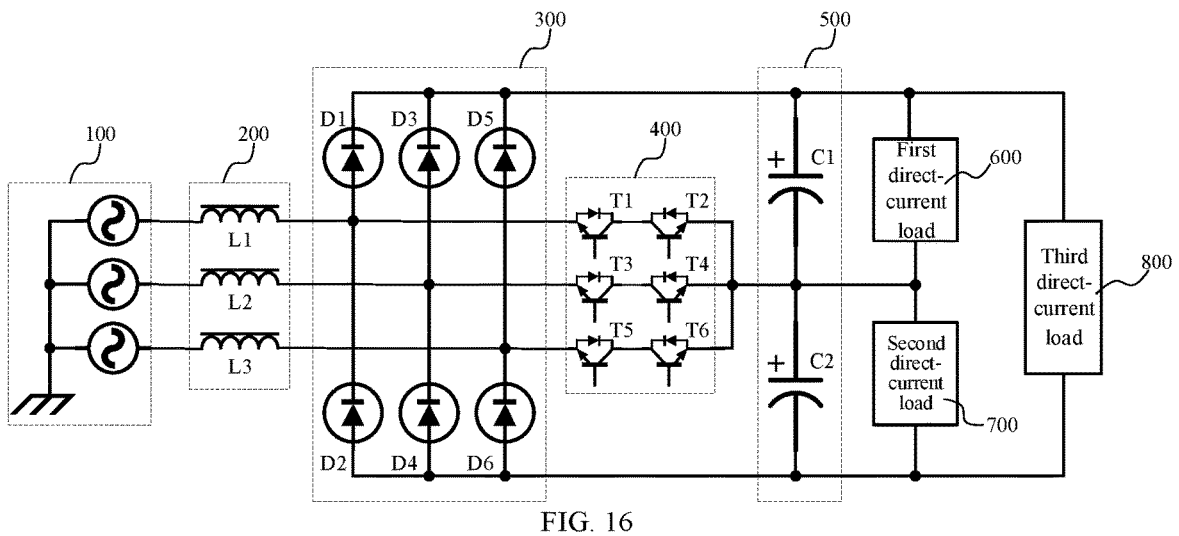
FIG. 15
FIG. 16

ELECTRIC CIRCUIT AND AIR CONDITIONER WITH DIRECT-CURRENT LOAD CONNECTED IN PARALLEL TO CAPACITOR IN ENERGY STORAGE MODULE

CROSS-REFERENCE TO RELATED APPLICATIONS

This application is a National Stage Entry under 35 U.S.C. § 371 of International Application No. PCT/CN2021/118018, filed on Sep. 13, 2021, which claims priority to Chinese Patent Application No. 202011063267.7, filed on Sep. 30, 2020 and entitled "ELECTRIC CIRCUIT AND AIR CONDITIONER" and Chinese Patent Application No. 202022223541.4, filed on Sep. 30, 2020 and entitled "ELECTRIC CIRCUIT AND AIR CONDITIONER", the disclosures of which are incorporated herein by reference in their entirety.

TECHNICAL FIELD

The present disclosure relates to the field of electronic circuit technologies, and more particularly, to an electronic circuit and an air conditioner.

BACKGROUND

In three-phase power supply, a direct-current fan load or an auxiliary power supply may also be provided in addition to a variable-frequency compressor load. However, a solution in the existing technology is generally as follows: a three-phase power supply outputs a voltage of a high-voltage direct-current bus after passing through a passive Power Factor Correction (PFC) rectifier circuit or a two-level active PFC rectifier circuit, and the variable-frequency compressor load is connected to the voltage of the high-voltage direct-current bus. However, because the voltage on the high-voltage direct-current bus exceeds the direct-current input voltage requirement of an Intelligent Power Module (IPM) of the direct-current fan load or the auxiliary power supply, the direct-current fan load or the auxiliary power supply is powered by an additional independent phase voltage after rectification instead of being powered from the voltage of the high-voltage direct-current bus. This technical solution will cause the load, to which power is supplied by the phase driving the direct-current fan or the auxiliary power supply, to be higher than those for the other two phases. Further, this additional load does not undergo the two-level active PFC circuit, resulting in larger harmonic in the current of this phase, and hence the three phase currents are not balanced, and it is difficult to meet the harmonic requirements of International Electrotechnical Commission (IEC).

SUMMARY

The present disclosure aims at solving at least one of the technical problems in the existing technology. Therefore, the present disclosure provides an electronic circuit and an air conditioner capable of providing a stable voltage, balancing three phase currents and effectively reducing a harmonic.

An electronic circuit according to an embodiment of a first aspect of the present disclosure includes:

a rectifier module, including a three-phase rectifier bridge and a bidirectional switch assembly, where the three-phase rectifier bridge includes a first bridge arm, a second bridge arm and a third bridge arm connected in parallel to each other; and the bidirectional switch assembly includes a first bidirectional switch, a second bidirectional switch and a third bidirectional switch, one end of the first bidirectional switch is connected to a midpoint of the first bridge arm, one end of the second bidirectional switch is connected to a midpoint of the second bridge arm, and one end of the third bidirectional switch is connected to a midpoint of the third bridge arm; and an energy storage module connected to a direct-current output end of the rectifier module, where the energy storage module includes two capacitors connected in series to each other, and the other end of the first bidirectional switch, the other end of the second bidirectional switch and the other end of the third bidirectional switch are all connected between the two capacitors;

where, at least one capacitor is connected in parallel with a direct-current load.

The electronic circuit according to the embodiments of the present disclosure at least has the following beneficial effects. The electronic circuit according to the embodiments of the present disclosure is provided with the rectifier module and the energy storage module, where the energy storage module includes the two capacitors connected in series to each other; moreover, according to the embodiments of the present disclosure, direct-current loads with low voltage resistance performance, such as the direct-current fan load or the auxiliary power supply, are connected in parallel to the capacitors in the energy storage module, so that the direct-current loads with low voltage resistance performance, such as the direct-current fan load or the auxiliary power supply, can be supplied with power through the capacitors in the energy storage module; moreover, three phase currents of the three-phase alternating-current power supply can be balanced, thus avoiding a harmonic of a certain phase current from being significantly large and effectively reducing the harmonic.

According to some embodiments of the present disclosure, the direct-current output end includes a positive bus end and a negative bus end, the two capacitors are a first capacitor and a second capacitor respectively, and the positive bus end is connected to the negative bus end through the first capacitor and the second capacitor in turn.

According to some embodiments of the present disclosure, the first capacitor is connected in parallel with a first direct-current load, the first direct-current load includes at least one of a first auxiliary power supply module or a first fan module, the first fan module includes a first direct-current fan and a first driver assembly configured for driving the first direct-current fan, and the first driver assembly is connected in parallel to the first capacitor.

According to some embodiments of the present disclosure, the second capacitor is connected in parallel with a second direct-current load, the second direct-current load includes at least one of a second auxiliary power supply module or a second fan module, the second fan module includes a second direct-current fan and a second driver assembly configured for driving the second direct-current fan, and the second driver assembly is connected in parallel to the second capacitor.

According to some embodiments of the present disclosure, the first capacitor is connected in parallel with a first direct-current load, and the second capacitor is connected in parallel with a second direct-current load; the first direct-current load includes at least one of a first auxiliary power supply module or a first fan module, the first fan module includes a first direct-current fan and a first driver assembly configured for driving the first direct-current fan, and the first driver assembly is connected in parallel to the first capacitor; and the second direct-current load includes at least one of a second auxiliary power supply module or a second fan module, the second fan module includes a second direct-current fan and a second driver assembly configured for driving the second direct-current fan, and the second driver assembly is connected in parallel to the second capacitor.

According to some embodiments of the present disclosure, a third direct-current load is included, where the third direct-current load is connected to the direct-current output end.

According to some embodiments of the present disclosure, the third direct-current load includes a compressor and a third driver assembly configured for driving the compressor, and the third driver assembly is connected to the direct-current output end.

According to some embodiments of the present disclosure, an alternating-current input end and an inductance device are included, and the alternating-current input end is connected to the rectifier module through the inductance device.

According to some embodiments of the present disclosure, the alternating-current input end includes a first phase input end, a second phase input end and a third phase input end, and the inductance device includes a first inductor, a second inductor and a third inductor, the first phase input end is connected to the midpoint of the first bridge arm through the first inductor, the second phase input end is connected to the midpoint of the second bridge arm through the second inductor, and the third phase input end is connected to the midpoint of the third bridge arm through the third inductor.

According to some embodiments of the present disclosure, the first bidirectional switch, the second bidirectional switch and the third bidirectional switch each include two power switch transistors reversely connected in series to each other.

According to some embodiments of the present disclosure, the first bidirectional switch, the second bidirectional switch and the third bidirectional switch each include two power switch transistors reversely connected in parallel to each other, and the two power switch transistors are each reversely connected in parallel to a diode.

According to some embodiments of the present disclosure, the first bidirectional switch, the second bidirectional switch and the third bidirectional switch each include a fourth bridge arm, a power switch transistor and a fifth bridge arm which are connected in parallel to each other.

An air conditioner according to an embodiment of a second aspect of the present disclosure includes the electronic circuit according to the first aspect.

The air conditioner according to the embodiments of the present disclosure at least has the following beneficial effects. The air conditioner according to the embodiments of the present disclosure includes the electronic circuit according to the first aspect, while the electronic circuit is provided with the rectifier module and the energy storage module, where the energy storage module includes the two capacitors which are connected in series to each other; moreover, according to the embodiments of the present disclosure, direct-current loads with low voltage resistance performance, such as the direct-current fan load or the auxiliary power supply, are connected in parallel to the capacitors in the energy storage module, so that the direct-current loads with low voltage resistance performance, such as the direct-current fan load or the auxiliary power supply, can be supplied with power through the capacitors in the energy storage module; moreover, three phase currents of the three-phase alternating-current power supply can be balanced, thus avoiding a harmonic of a certain phase current from being significantly large and effectively reducing the harmonic.

BRIEF DESCRIPTION OF DRAWINGS

The above and/or additional aspects and advantages of the present disclosure will be apparent and easy to understand from the following description of the embodiments in conjunction with the accompanying drawings, where:

FIG. 14 is a topology diagram of a T-type three-level active PFC circuit with a direct-current load connected in parallel to a lower half bus provided by another embodiment of the present disclosure;

FIG. 15 is a topology diagram of a T-type three-level active PFC circuit with a direct-current load connected in parallel to a lower half bus provided by another embodiment of the present disclosure;

FIG. 16 is a topology diagram of a T-type three-level active PFC circuit with direct-current loads connected in parallel to an upper half bus and a lower half bus respectively provided by an embodiment of the present disclosure;

DETAILED DESCRIPTION

Figures 1, 2:
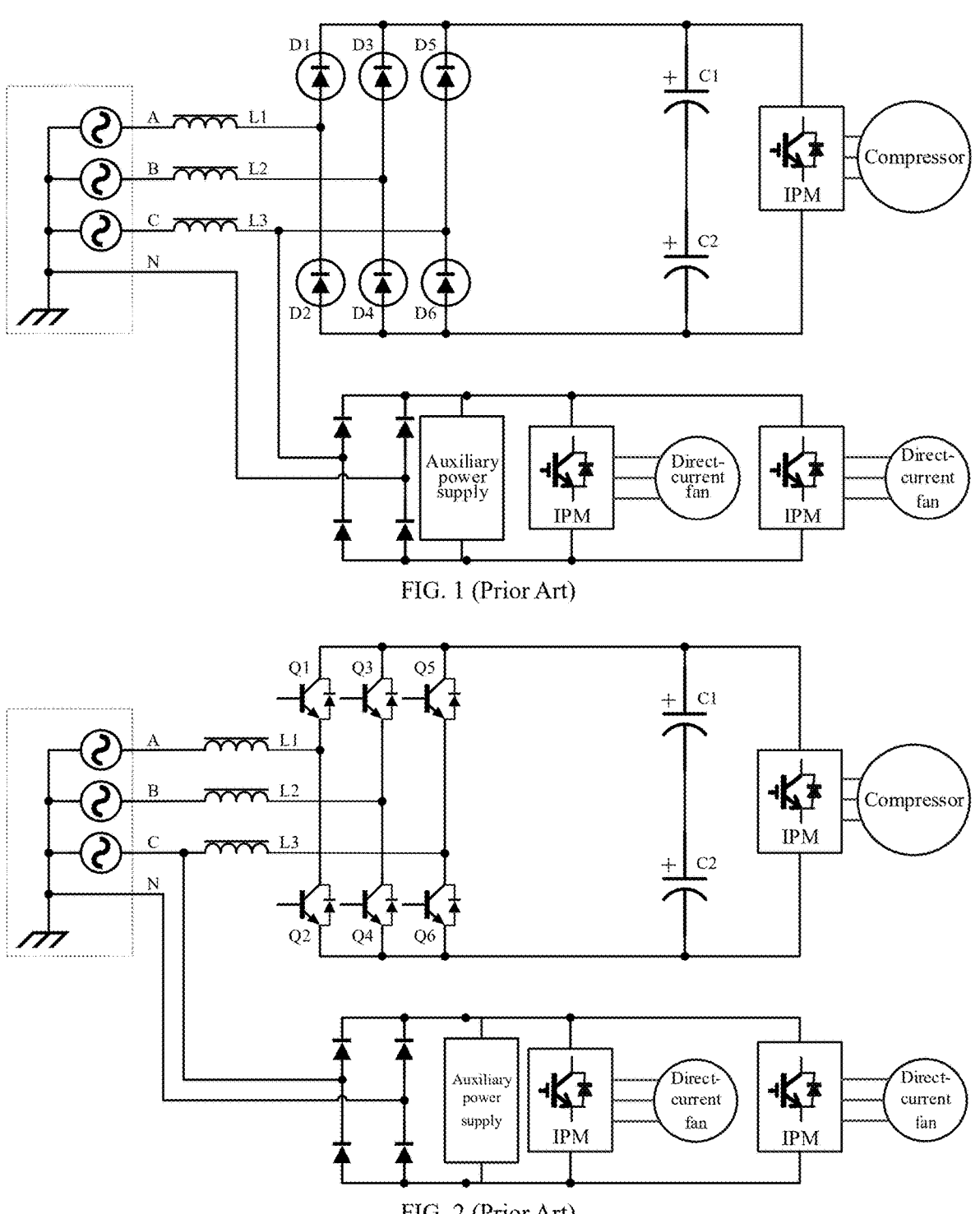
FIG. 1 is a topology diagram of a three-phase passive PFC circuit with an auxiliary power supply and two direct-current fan loads in the existing technology.
FIG. 2 is a topology diagram of a two-level active PFC circuit with an auxiliary power supply and two direct-current fan loads in the existing technology.

The embodiments of the present disclosure will be described in detail hereinafter. Examples of the embodiments are shown in the accompanying drawings. The same or similar reference numerals throughout the drawings denote the same or similar elements or elements having the same or similar functions. The embodiments described below with reference to the accompanying drawings are as examples and are only intended to explain the present disclosure, but should not be understood as limiting the present disclosure.

In the description of the present disclosure, it should be understood that the orientation or position relation related to the orientation description, such as the orientation or position relation indicated by the upper, lower, front, rear, left, right, etc., is based on the orientation or position relation shown in the drawings, which is only utilized for convenience of description of the present disclosure and simplification of description instead of indicating or implying that the indicated device or element must have a specific orientation, and be constructed and operated in a specific orientation, and thus shall not be understood as a limitation to the present disclosure.

In the description of the present disclosure, the meaning of several is one or multiple, and the meaning of multiple is above two. The meanings of greater than, less than, more than, etc., are understood as not including this number, while the meanings of above, below, within, etc., are understood as including this number. If there is a description of first and second, it is only for the purpose of distinguishing technical features, and shall not be understood as indicating or implying relative importance, implicitly indicating the number of the indicated technical features or implicitly indicating the order of the indicated technical features.

In the description of the present disclosure, unless otherwise explicitly defined, words such as setting, installing and connecting should be understood in a broad sense, and those having ordinary skill in the art can reasonably determine the meanings of the above words in the present disclosure in combination with the contents of the technical solutions.

In the related art, for a high-efficiency variable-frequency air-conditioning system powered by a three-phase power supply, except for a variable-frequency compressor load, a direct-current fan load or an auxiliary power supply may be provided, where some air-conditioning systems are provided with one direct-current fan, and some air-conditioning systems are provided two or more direct-current fans. A solution in the existing technology is generally as follows: the three-phase power supply outputs a voltage of a high-voltage direct-current bus after passing through a passive PFC rectifier circuit or a two-level active PFC rectifier circuit, and the variable-frequency compressor load is connected to the voltage of the high-voltage direct-current bus. However, the direct-current fan load and the auxiliary power supply are powered by an additional independent phase voltage after rectification instead of being powered from the voltage of the high-voltage direct-current bus. The reason for such design is that: the auxiliary power supply and an IPM module configured for driving the direct-current fan have insufficient withstand voltage, and cannot be directly powered from the high-voltage direct-current bus.

In an example, an effective value of a three-phase line voltage is nominally 380 V, and then the voltage of the high-voltage direct-current bus after rectification is 537 V. With 10% allowable error of power supply voltage fluctuation, the voltage of the high-voltage direct-current bus may probably reach 590 V. Under the control of the active PFC, the voltage of the direct-current bus can be further increased. A withstand voltage of a high-voltage electrolytic capacitor is generally lower than 450 V. Under this application scene, a withstand voltage of a high-voltage electrolytic capacitor of a direct-current bus has to be increased by a two-stage series connection mode, and the withstand voltage of the two-stage series connection can reach 900 V theoretically. However, the withstand voltage of the IPM module configured for driving the direct-current fan is generally 500 V or 600 V, and in addition to a withstand voltage derating requirement on the IPM module, an input voltage of the IPM module configured for driving the direct-current fan is generally lower than 450V in fact. As the voltage of the high-voltage direct-current bus is higher than the input voltage of the IPM module configured for driving the direct-current fan, the IPM module cannot be directly powered from the high-voltage direct-current bus.

In addition, similarly, a direct-current input voltage of the auxiliary power supply in the air-conditioning system is also required to be lower than 450 V. The reason is that a withstand voltage of a switching power supply chip of an auxiliary power supplies such as a flyback switching power supply is generally lower than 700 V, while an actual peak voltage of the switching power supply chip is a sum of a direct-current input voltage, a reflected voltage of a switch transformer (100 V to 200 V) and a leakage inductance voltage drop (100 V to 200 V), so the direct-current input voltage of the auxiliary power supply is generally lower than 450 V when the auxiliary power supply works stably. In other words, the auxiliary power supply cannot be powered from the high-voltage direct-current bus either, but needs to be powered by an additional independent phase voltage after rectification.

Figures 3, 4:
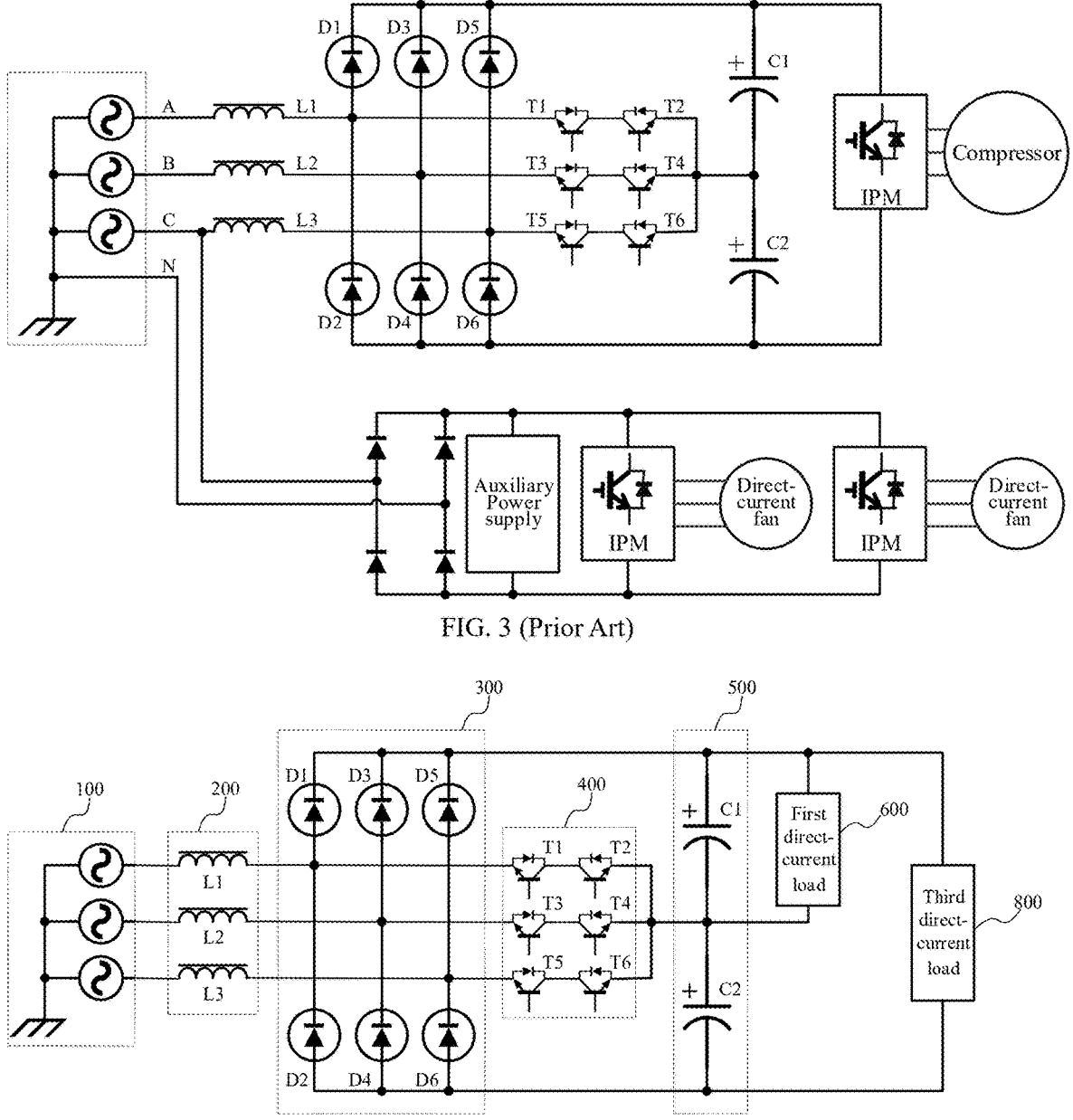
FIG. 3 is a topology diagram of a T-type three-level active PFC circuit with an auxiliary power supply and two direct-current fan loads in the existing technology.
FIG. 4 is a topology diagram of a T-type three-level active PFC circuit with a direct-current load connected in parallel to an upper half bus provided by an embodiment of the present disclosure.

Based on the above design reasons, present circuit topology diagrams of an air-conditioning system powered by a three-phase power supply mainly include, but are not limited to the following three types, which are circuit topology diagrams shown in FIG. 1 to FIG. 3 respectively.

For a topology diagram of a three-phase passive PFC circuit with an auxiliary power supply and two direct-current fan loads shown in FIG. 1, a variable-frequency compressor load is connected to a high-voltage direct-current bus. Moreover, as the voltage of the high-voltage direct-current bus exceeds the direct-current input voltage requirement of an IPM module of the direct-current fan or the auxiliary power supply, the direct-current fan load or the auxiliary power supply is powered by an additional independent phase voltage after rectification instead of being powered from the voltage of the high-voltage direct-current bus.

For a topology diagram of a two-level active PFC circuit with an auxiliary power supply and two direct-current fan loads shown in FIG. 2, a variable-frequency compressor load is connected to a voltage of a high-voltage direct-current bus. Moreover, as the voltage of the high-voltage direct-current bus exceeds the direct-current input voltage requirement of an IPM module of the direct-current fan or the auxiliary power supply, the direct-current fan load or the auxiliary power supply is powered by an additional independent phase voltage after rectification instead of being powered from the voltage of the high-voltage direct-current bus.

For a topology diagram of a T-type three-level active PFC circuit with an auxiliary power supply and two direct-current fan loads shown in FIG. 3, a variable-frequency compressor load is connected to a voltage of a high-voltage direct-current bus. Moreover, as the voltage of the high-voltage direct-current bus exceeds the direct-current input voltage requirement of an IPM module of the direct-current fan or the auxiliary power supply, the direct-current fan load or the auxiliary power supply is powered by an additional independent phase voltage after rectification instead of being powered from the voltage of the high-voltage direct-current bus.

For the above-mentioned existing power supply solution, there is a need to use a rectified independent phase voltage to supply power to the direct-current fan load and the auxiliary power supply, so that the rectified direct-current voltage can meet the withstand voltage requirements of the IPM module and the auxiliary power supply. However, this power supply solution would cause the load supplied by the phase of the direct-current fan load or the auxiliary power supply to be higher than that of the other two phases, and this additional load does not pass through the two-level active PFC circuit, resulting in a significantly larger harmonic of this phase current and unbalanced three phase currents, and being difficult to meet the harmonic requirements of the IEC.

Therefore, based on the above situations, the embodiments of the present disclosure provide an electronic circuit and an air conditioner, where the electronic circuit includes a rectifier module and an energy storage module. The rectifier module includes a three-phase rectifier bridge and a bidirectional switch assembly, and the three-phase rectifier bridge includes a first bridge arm, a second bridge arm and a third bridge arm which are connected in parallel to each other. The bidirectional switch assembly includes a first bidirectional switch, a second bidirectional switch and a third bidirectional switch, one end of the first bidirectional switch is connected to a midpoint of the first bridge arm, one end of the second bidirectional switch is connected to a midpoint of the second bridge arm, and one end of the third bidirectional switch is connected to a midpoint of the third bridge arm. The energy storage module is connected to a direct-current output end of the rectifier module, the energy storage module includes two capacitors which are connected in series to each other, and the other end of the first bidirectional switch, the other end of the second bidirectional switch and the other end of the third bidirectional switch are all connected between the two capacitors. At least one capacitor is connected in parallel with a direct-current load. According to the technical solution of the embodiments of the present disclosure, direct-current loads with low voltage resistance performance, such as the direct-current fan load or the auxiliary power supply, are connected in parallel to the capacitors in the energy storage module, so that the direct-current loads with low voltage resistance performance, such as the direct-current fan load or the auxiliary power supply, can be supplied with power through the capacitors in the energy storage module. Moreover, three phase currents of the three-phase alternating-current power supply can be balanced, thus avoiding a harmonic of a certain phase current from being significantly large and effectively reducing the harmonic.

The embodiments of the present disclosure are described below with reference to the accompanying drawings.

Figure 10:
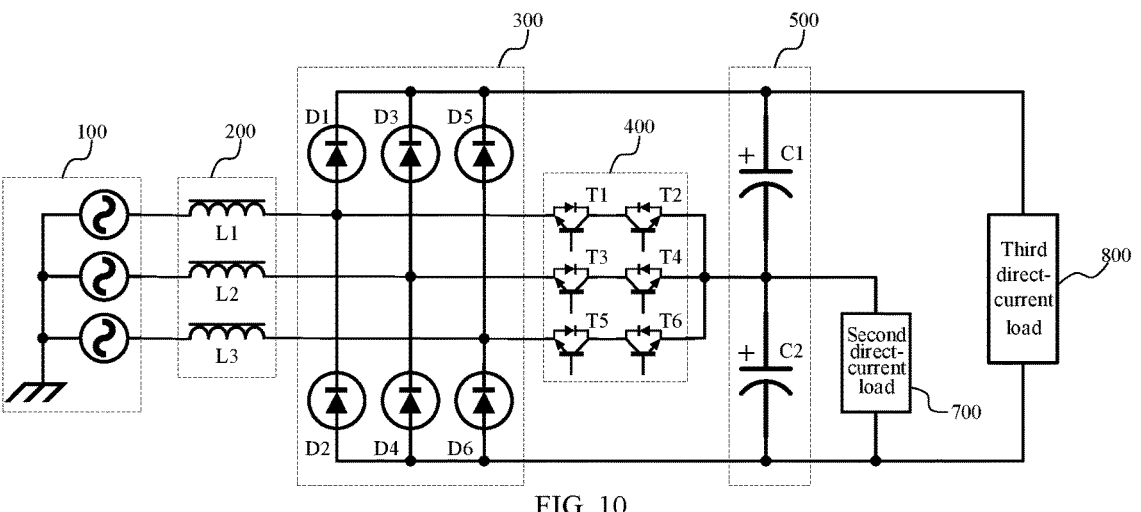
FIG. 10 is a topology diagram of a T-type three-level active PFC circuit with a direct-current load connected in parallel to a lower half bus provided by an embodiment of the present disclosure.

As shown in FIG. 4, FIG. 10 and FIG. 16, FIG. 4, FIG. 10 and FIG. 16 are schematic diagrams of the electronic circuit provided by some embodiments of the present disclosure.

In an embodiment, the electronic circuit includes a rectifier module and an energy storage module 500. The rectifier module includes a three-phase rectifier bridge 300 and a bidirectional switch assembly 400, and the three-phase rectifier bridge 300 includes a first bridge arm, a second bridge arm and a third bridge arm which are connected in parallel to each other. The bidirectional switch assembly 400 includes a first bidirectional switch, a second bidirectional switch and a third bidirectional switch, one end of the first bidirectional switch is connected to a midpoint of the first bridge arm, one end of the second bidirectional switch is connected to a midpoint of the second bridge arm, and one end of the third bidirectional switch is connected to a midpoint of the third bridge arm. The energy storage module 500 is connected to a direct-current output end of the rectifier module, the energy storage module 500 includes two capacitors which are connected in series to each other, and the other end of the first bidirectional switch, the other end of the second bidirectional switch and the other end of the third bidirectional switch are all connected between the two capacitors. At least one capacitor is connected in parallel with a direct-current load.

In an embodiment, as the direct-current loads with low voltage resistance performance, such as the direct-current fan load or the auxiliary power supply, are connected in parallel to the capacitors in the energy storage module according to the embodiments of the present disclosure, so that the direct-current loads with low voltage resistance performance, such as the direct-current fan load or the auxiliary power supply, can be supplied with power through the capacitors in the energy storage module 500. Moreover, three phase currents of the three-phase alternating-current power supply can be balanced, thus avoiding a harmonic of a certain phase current from being significantly large and effectively reducing the harmonic.

It should be noted that as for the first bridge arm, the second bridge arm and the third bridge arm in the three-phase rectifier bridge 300 mentioned above, in some embodiments, the first bridge arm includes a first diode D1 and a second diode D2 as shown in FIG. 4, FIG. 10 and FIG. 16, the second bridge arm includes a third diode D3 and a fourth diode D4 as shown in FIG. 4, FIG. 10 and FIG. 16, and the third bridge arm includes a fifth diode D5 and a sixth diode D6 as shown in FIG. 4, FIG. 10 and FIG. 16.

Figure 24:
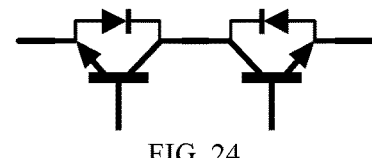
FIG. 24 is a schematic structural diagram regarding a first bidirectional switch, a second bidirectional switch and a third bidirectional switch provided by an embodiment of the present disclosure.

In an embodiment, the first bidirectional switch, the second bidirectional switch and the third bidirectional switch in the bidirectional switch assembly 400 above each include two power switch transistors reversely connected in parallel to each other, and the two power switch transistors are each reversely connected in parallel to a diode, as shown in FIG. 24. In an implementation, the first bidirectional switch includes a first IGBT module T1 and a second IGBT module T2 as shown in FIG. 4, FIG. 10 and FIG. 16, the second bidirectional switch includes a third IGBT module T3 and a fourth IGBT module T4 as shown in FIG. 4, FIG. 10 and FIG. 16, and the third bidirectional switch includes a fifth IGBT module T5 and a sixth IGBT module T6 as shown in FIG. 4, FIG. 10 and FIG. 16.

Figure 25:
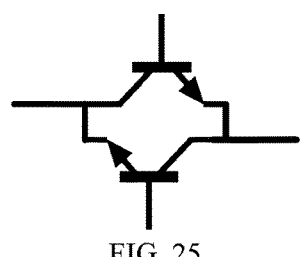
FIG. 25 is a schematic structural diagram regarding a first bidirectional switch, a second bidirectional switch and a third bidirectional switch provided by another embodiment of the present disclosure.
Figure 26:
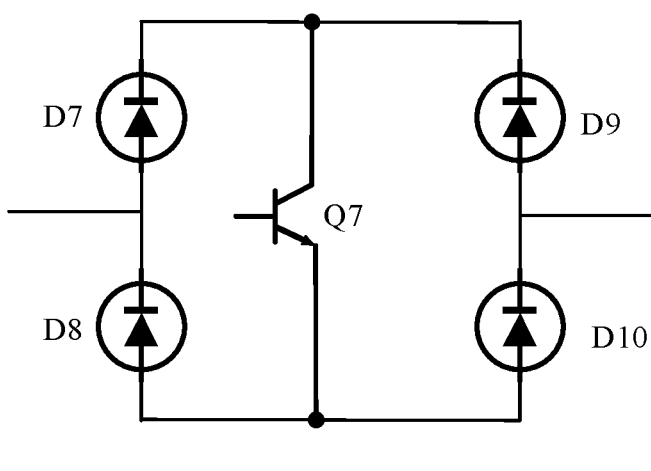
FIG. 26 is a schematic structural diagram regarding a first bidirectional switch, a second bidirectional switch and a third bidirectional switch provided by another embodiment of the present disclosure.

In an embodiment, the first bidirectional switch, the second bidirectional switch and the third bidirectional switch in the bidirectional switch assembly 400 above also include two power switch transistors reversely connected in series to each other as shown in FIG. 25 in addition to the two power switch transistors reversely connected in parallel to each other as shown in FIG. 24. In another embodiment, a fourth bridge arm, a power switch transistor and a fifth bridge arm which are connected in parallel to each other as shown in FIG. 26 can be included. In an implementation, the fourth bridge arm include a seventh diode D7 and an eighth diode D8 as shown in FIG. 26, and the fifth bridge arm include a ninth diode D9 and a tenth diode D10 as shown in FIG. 26. In an example, at least one diode in the seventh diode D7, the eighth diode D8, the ninth diode D9 and the tenth diode D10 can be replaced by a MOS tube, an IGBT tube with anti-parallel diode and other devices with reverse cut-off function. In an example, the above-mentioned power switch transistor can be IGBT, MOSFET and other devices that can be controlled on and off.

In an embodiment, for the direct-current output end and the two capacitors mentioned above, the direct-current output end includes a positive bus end and a negative bus end, the two capacitors can be the first capacitor C1 and the second capacitor C2 as shown in FIG. 4, FIG. 10 and FIG. 16 respectively, and the positive bus end is connected to the negative bus end through the first capacitor C1 and second capacitor C2 in turn.

It is worth noting that a half bus in the embodiments of the present disclosure means that in a high-voltage direct-current bus filter circuit adopting two-stage capacitors connected in series, an upper half bus is arranged between a midpoint of the two-stage capacitors connected in series and a positive bus, a lower half bus is arranged between the midpoint of the two-stage capacitors connected in series and the negative bus, and both the upper half bus and the lower half bus are half buses. In an embodiment of the present disclosure, the upper half bus is arranged between a midpoint of the first capacitor C1 and the second capacitor C2 connected in series and the positive bus end, and the lower half bus is arranged between the midpoint of the first capacitor C1 and the second capacitor C2 connected in series and the negative bus end.

It should be noted that the electronic circuit in an embodiment of the present disclosure includes, but is not limited to, an alternating-current input end 100 and an inductance device 200, where the alternating-current input end 100 is connected to the rectifier module through the inductance device 200.

In an embodiment, the alternating-current input end 100 includes a first phase input end, a second phase input end and a third phase input end, and the inductance device 200 includes a first inductor, a second inductor and a third inductor. The first phase input end is connected to the midpoint of the first bridge arm through the first inductor, the second phase input end is connected to the midpoint of the second bridge arm through the second inductor, and the third phase input end is connected to the midpoint of the third bridge arm through the third inductor. In an implementation, the first inductor refers to the first inductor L1 as shown in FIG. 4, FIG. 10 and FIG. 16, the second inductor refers to the second inductor L2 as shown in FIG. 4, FIG. 10 and FIG. 16, and the third inductor refers to the third inductor L3 as shown in FIG. 4, FIG. 10 and FIG. 16.

Based on a topology diagram of a T-type three-level active PFC circuit with a direct-current load connected in parallel to an upper half bus as shown in FIG. 4, the first capacitor C1 is connected in parallel with a first direct-current load 600. The first direct-current load 600 includes, but is not limited to at least one of a first auxiliary power supply module or a first fan module, and the first fan module includes, but is not limited to a first direct-current fan and a first driver assembly configured for driving the first direct-current fan, and the first driver assembly is connected in parallel to the first capacitor C1.

In some embodiments, in the actual application process, the topology diagram of the T-type three-level active PFC circuit shown in FIG. 4 include, but is not limited to topology diagrams of T-type three-level active PFC circuits with a direct-current load connected in parallel to an upper half bus as shown in FIG. 5 to FIG. 9.

Figure 5:
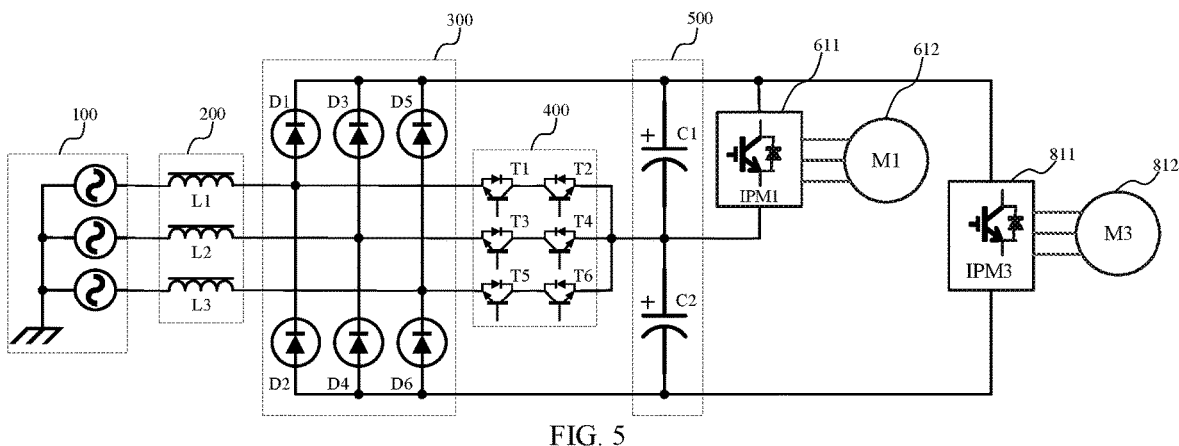
FIG. 5 is a topology diagram of a T-type three-level active PFC circuit with a direct-current load connected in parallel to an upper half bus provided by another embodiment of the present disclosure.

As shown in FIG. 5, the first capacitor C1 is connected in parallel with a first direct-current load 600, where the first direct-current load 600 is a first fan module. The first fan module includes a first direct-current fan 612 and a first driver assembly 611 configured for driving the first direct-current fan 612, and the first driver assembly 611 is connected in parallel to the first capacitor C1.

Figure 6:
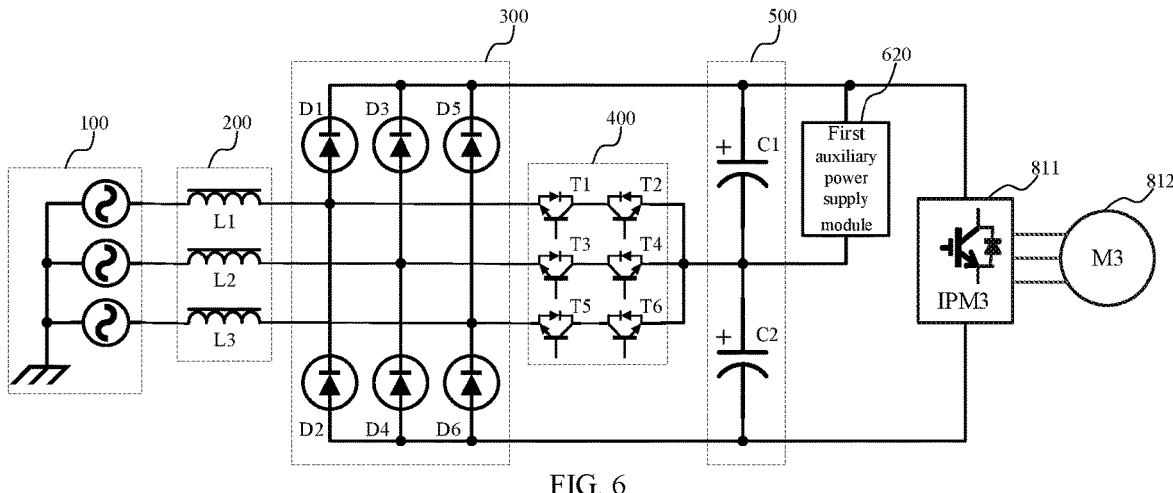
FIG. 6 is a topology diagram of a T-type three-level active PFC circuit with a direct-current load connected in parallel to an upper half bus provided by another embodiment of the present disclosure.

As shown in FIG. 6, the first capacitor C1 is connected in parallel with a first direct-current load 600, where the first direct-current load 600 is a first auxiliary power supply module 620.

Figure 7:
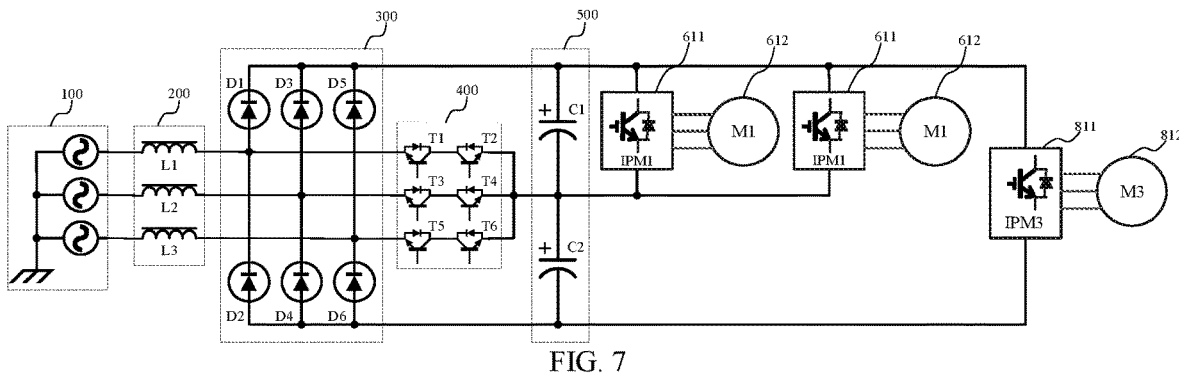
FIG. 7 is a topology diagram of a T-type three-level active PFC circuit with a direct-current load connected in parallel to an upper half bus provided by another embodiment of the present disclosure.

As shown in FIG. 7, the first capacitor C1 is connected in parallel with a first direct-current load 600, where the first direct-current load 600 includes two first fan modules. Each first fan module includes a first direct-current fan 612 and a first driver assembly 611 configured for driving the first direct-current fan 612, and the first driver assembly 611 is connected in parallel to the first capacitor C1.

Figure 8:
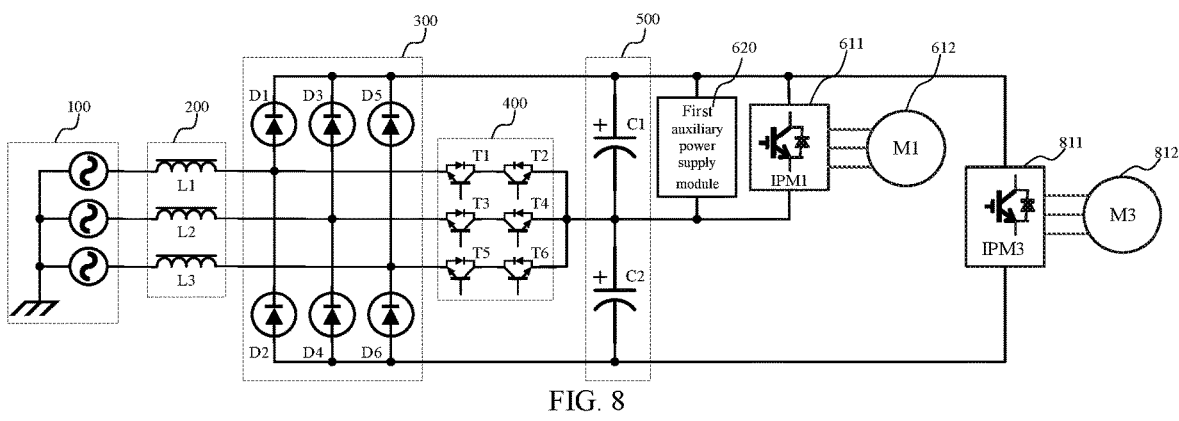
FIG. 8 is a topology diagram of a T-type three-level active PFC circuit with a direct-current load connected in parallel to an upper half bus provided by another embodiment of the present disclosure.

As shown in FIG. 8, the first capacitor C1 is connected in parallel with a first direct-current load 600, where the first direct-current load 600 includes a first auxiliary power supply module 620 and one first fan module. The first fan module includes a first direct-current fan 612 and a first driver assembly 611 configured for driving the first direct-current fan 612, and the first driver assembly 611 is connected in parallel to the first capacitor C1.

Figure 9:
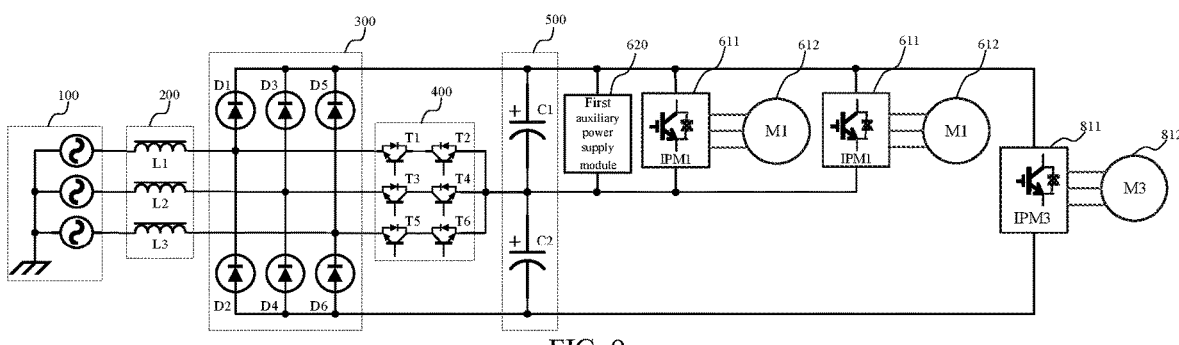
FIG. 9 is a topology diagram of a T-type three-level active PFC circuit with a direct-current load connected in parallel to an upper half bus provided by another embodiment of the present disclosure.

As shown in FIG. 9, the first capacitor C1 is connected in parallel with a first direct-current load 600, where the first direct-current load 600 includes a first auxiliary power supply module 620 and two first fan modules. Each first fan module includes a first direct-current fan 612 and a first driver assembly 611 configured for driving the first direct-current fan 612, and the first driver assembly 611 is connected in parallel to the first capacitor C1.

Based on a topology diagram of a T-type three-level active PFC circuit with a direct-current load connected in parallel to a lower half bus as shown in FIG. 10, the second capacitor C2 is connected in parallel with a second direct-current load 700. The second direct-current load 700 includes, but is not limited to at least one of a second auxiliary power supply module or a second fan module, and the second fan module includes a second direct-current fan and a second driver assembly configured for driving the second direct-current fan, and the second driver assembly is connected in parallel to the second capacitor C2.

In some embodiments, in the actual application process, the topology diagram of the T-type three-level active PFC circuit shown in FIG. 10 include, but is not limited to topology diagrams of T-type three-level active PFC circuits with a direct-current load connected in parallel to a lower half bus as shown in FIG. 11 to FIG. 15.

Figure 11:
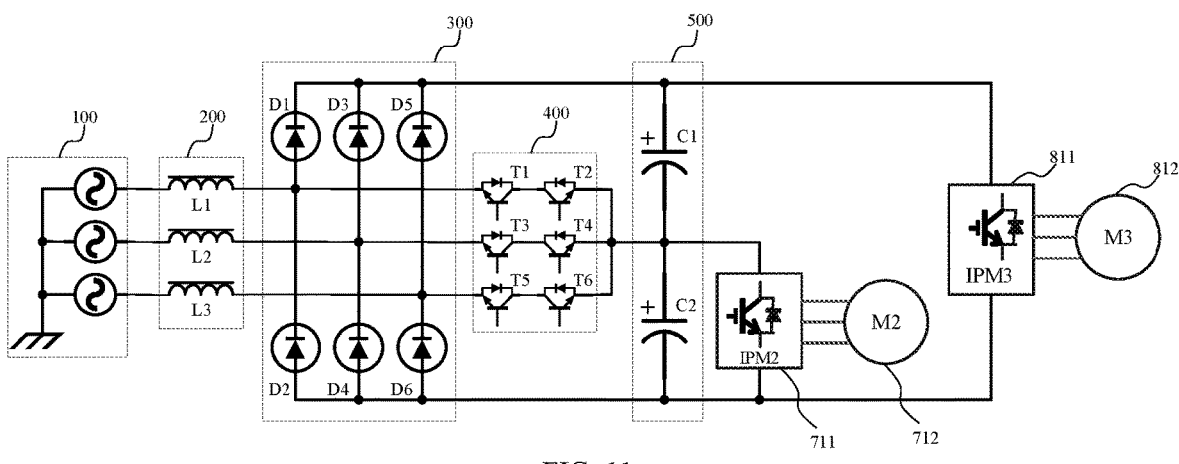
FIG. 11 is a topology diagram of a T-type three-level active PFC circuit with a direct-current load connected in parallel to a lower half bus provided by another embodiment of the present disclosure.

As shown in FIG. 11, the second capacitor C2 is connected in parallel with a second direct-current load 700, where the second direct-current load 700 is a second fan module, and the second fan module includes a second direct-current fan 712 and a second driver assembly 711 configured for driving the second direct-current fan 712, and the second driver assembly 711 is connected in parallel to the second capacitor C2.

Figure 12:
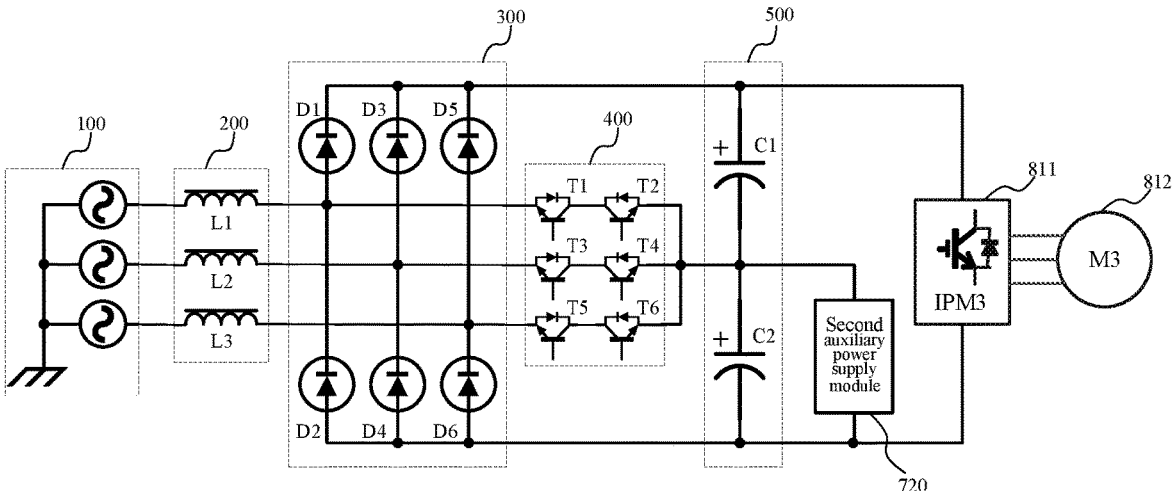
FIG. 12 is a topology diagram of a T-type three-level active PFC circuit with a direct-current load connected in parallel to a lower half bus provided by another embodiment of the present disclosure.

As shown in FIG. 12, the second capacitor C2 is connected in parallel with a second direct-current load 700, where the second direct-current load 700 is a second auxiliary power supply module 720.

Figure 13:
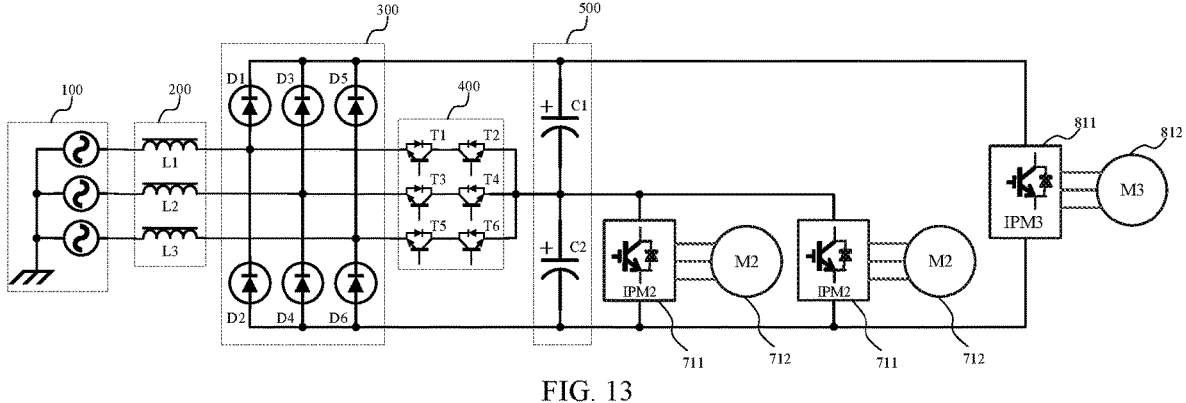
FIG. 13 is a topology diagram of a T-type three-level active PFC circuit with a direct-current load connected in parallel to a lower half bus provided by another embodiment of the present disclosure.

As shown in FIG. 13, the second capacitor C2 is connected in parallel with a second direct-current load 700, where the second direct-current load 700 includes two second fan modules, each second fan module includes a second direct-current fan 712 and a second driver assembly 711 configured for driving the second direct-current fan 712, and the second driver assembly 711 is connected in parallel to the second capacitor C2.

As shown in FIG. 14, the second capacitor C2 is connected in parallel with a second direct-current load 700, where the second direct-current load 700 includes a second auxiliary power supply module 720 and one second fan module The second fan module includes a second direct-current fan 712 and a second driver assembly 711 configured for driving the second direct-current fan 712, and the second driver assembly 711 is connected in parallel to the second capacitor C2.

As shown in FIG. 15, the second capacitor C2 is connected in parallel with a second direct-current load 700, where the second direct-current load 700 includes a second auxiliary power supply module 720 and two second fan modules. Each second fan module includes a second direct-current fan 712 and a second driver assembly 711 configured for driving the second direct-current fan 712, and the second driver assembly 711 is connected in parallel to the second capacitor C2.

Based on a topology diagram of a T-type three-level active PFC circuit with direct-current loads connected in parallel to an upper half bus and a lower half bus respectively as shown in FIG. 16, the first capacitor C1 is connected in parallel with a first direct-current load 600, and the second capacitor C2 is connected in parallel with a second direct-current load 700. The first direct-current load 600 includes at least one of a first auxiliary power supply module or a first fan module. The first fan module includes a first direct-current fan and a first driver assembly configured for driving the first direct-current fan, and the first driver assembly is connected in parallel to the first capacitor C1. The second direct-current load 700 includes at least one of a second auxiliary power supply module or a second fan module. The second fan module includes a second direct-current fan and a second driver assembly configured for driving the second direct-current fan, and the second driver assembly is connected in parallel to the second capacitor C2.

In some embodiments, in the actual application process, the topology diagram of the T-type three-level active PFC circuit shown in FIG. 16 include, but is not limited to topology diagrams of T-type three-level active PFC circuits with direct-current loads connected in parallel on an upper half bus and a lower half bus respectively as shown in FIG. 17 to FIG. 23.

Figure 17:
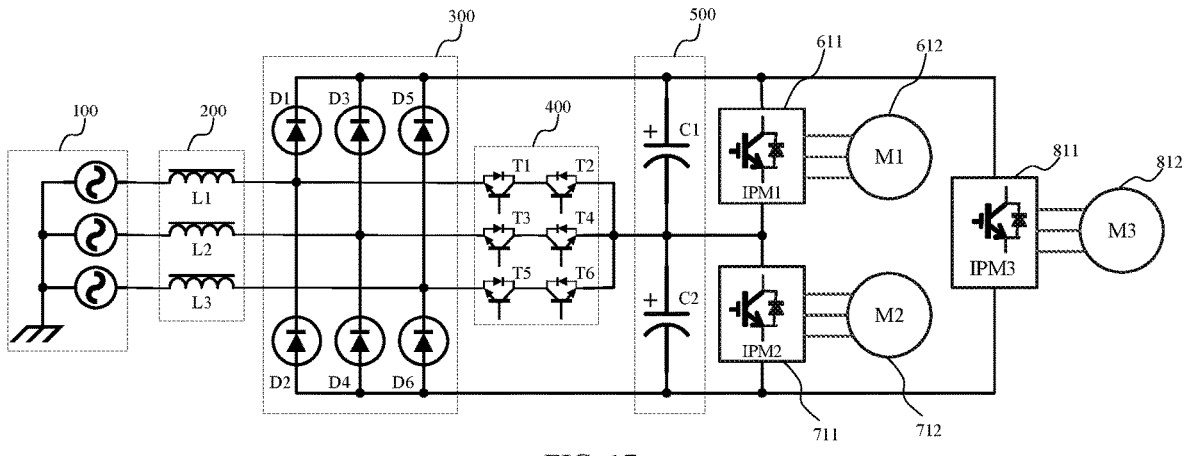
FIG. 17 is a topology diagram of a T-type three-level active PFC circuit with direct-current loads connected in parallel to an upper half bus and a lower half bus respectively provided by another embodiment of the present disclosure.

As shown in FIG. 17, the first capacitor C1 is connected in parallel with a first direct-current load 600, and the second capacitor C2 is connected in parallel with a second direct-current load 700. The first direct-current load 600 is a first fan module, the first fan module includes a first direct-current fan 612 and a first driver assembly 611 configured for driving the first direct-current fan 612, and the first driver assembly 611 is connected in parallel to the first capacitor C1. The second direct-current load 700 is a second fan module, the second fan module includes a second direct-current fan 712 and a second driver assembly 711 configured for driving the second direct-current fan 712, and the second driver assembly 711 is connected in parallel to the second capacitor C2.

Figure 18:
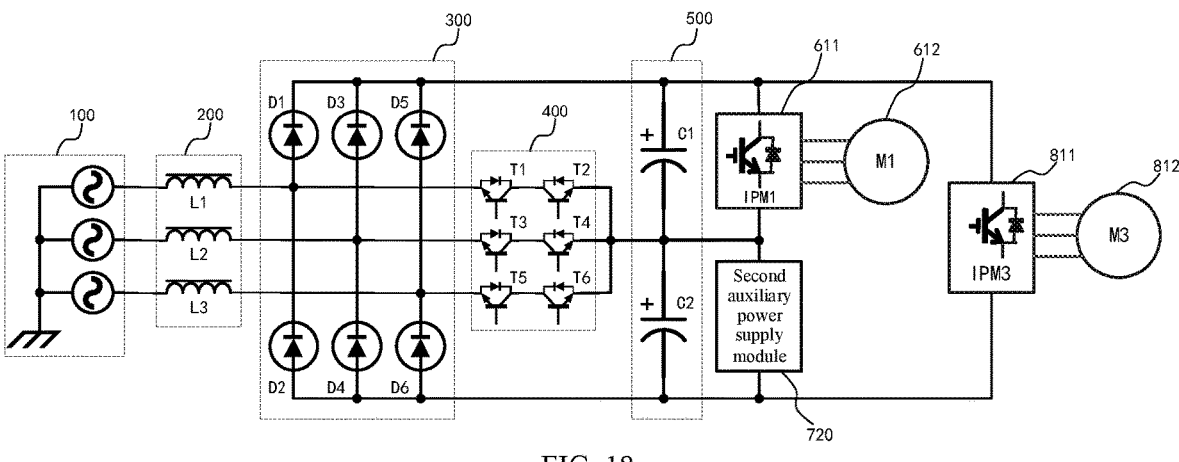
FIG. 18 is a topology diagram of a T-type three-level active PFC circuit with direct-current loads connected in parallel to an upper half bus and a lower half bus respectively provided by another embodiment of the present disclosure.

As shown in FIG. 18, the first capacitor C1 is connected in parallel with a first direct-current load 600, and the second capacitor C2 is connected in parallel with a second direct-current load 700. The first direct-current load 600 is a first fan module, the first fan module includes a first direct-current fan 612 and a first driver assembly 611 configured for driving the first direct-current fan 612, and the first driver assembly 611 is connected in parallel to the first capacitor C1. The second direct-current load 700 is a second auxiliary power supply module 720.

Figure 19:
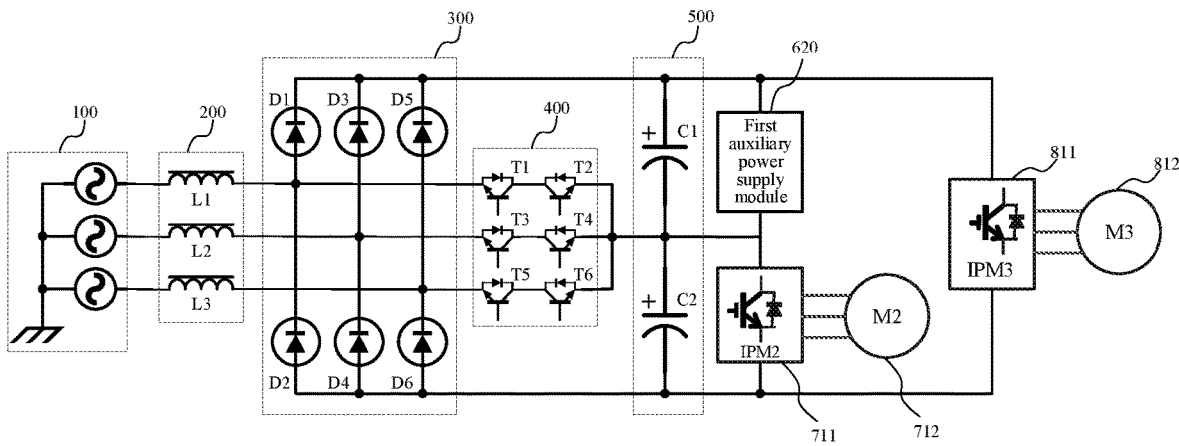
FIG. 19 is a topology diagram of a T-type three-level active PFC circuit with direct-current loads connected in parallel to an upper half bus and a lower half bus respectively provided by another embodiment of the present disclosure.

As shown in FIG. 19, the first capacitor C1 is connected in parallel with a first direct-current load 600, and the second capacitor C2 is connected in parallel with a second direct-current load 700. The first direct-current load 600 is a first auxiliary power supply module 620. The second direct-current load 700 is a second fan module, the second fan module includes a second direct-current fan 712 and a second driver assembly 711 configured for driving the second direct-current fan 712, and the second driver assembly 711 is connected in parallel to the second capacitor C2.

Figure 20:
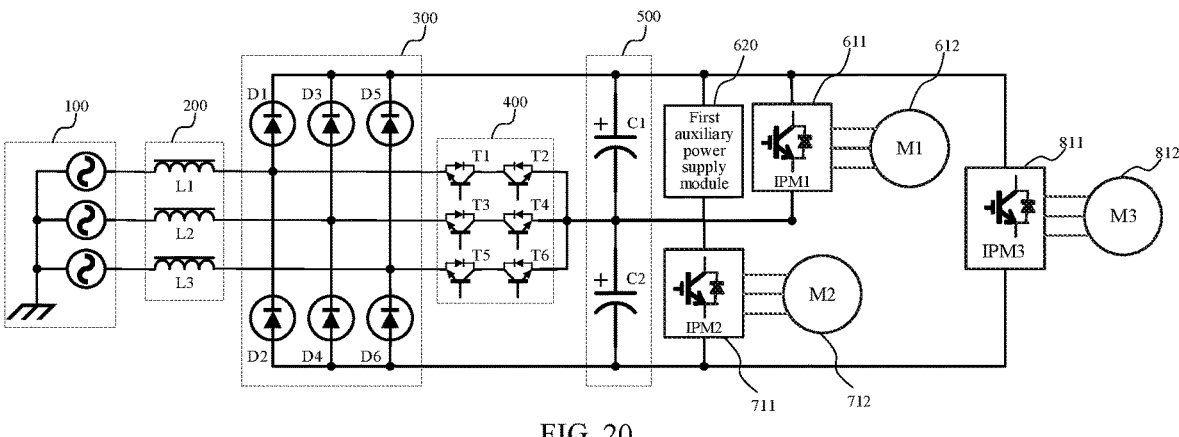
FIG. 20 is a topology diagram of a T-type three-level active PFC circuit with direct-current loads connected in parallel to an upper half bus and a lower half bus respectively provided by another embodiment of the present disclosure.

As shown in FIG. 20, the first capacitor C1 is connected in parallel with a first direct-current load 600, and the second capacitor C2 is connected in parallel with a second direct-current load 700. The first direct-current load 600 includes a first auxiliary power supply module 620 and one first fan module, the first fan module includes a first direct-current fan 612 and a first driver assembly 611 configured for driving the first direct-current fan 612, and the first driver assembly 611 is connected in parallel to the first capacitor C1. The second direct-current load 700 is a second fan module, the second fan module includes a second direct-current fan 712 and a second driver assembly 711 configured for driving the second direct-current fan 712, and the second driver assembly 711 is connected in parallel to the second capacitor C2.

Figure 21:
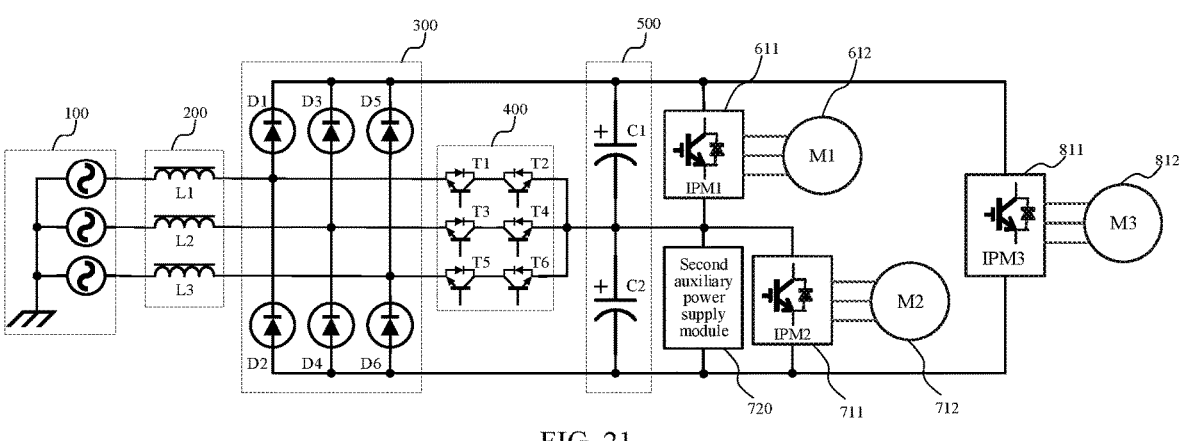
FIG. 21 is a topology diagram of a T-type three-level active PFC circuit with direct-current loads connected in parallel to an upper half bus and a lower half bus respectively provided by another embodiment of the present disclosure.

As shown in FIG. 21, the first capacitor C1 is connected in parallel with a first direct-current load 600, and the second capacitor C2 is connected in parallel with a second direct-current load 700. The first direct-current load 600 is a first fan module, the first fan module includes a first direct-current fan 612 and a first driver assembly 611 configured for driving the first direct-current fan 612, and the first driver assembly 611 is connected in parallel to the first capacitor C1. The second direct-current load 700 includes a second auxiliary power supply module 720 and one second fan module, the second fan module includes a second direct-current fan 712 and a second driver assembly 711 configured for driving the second direct-current fan 712, and the second driver assembly 711 is connected in parallel to the second capacitor C2.

Figure 22:
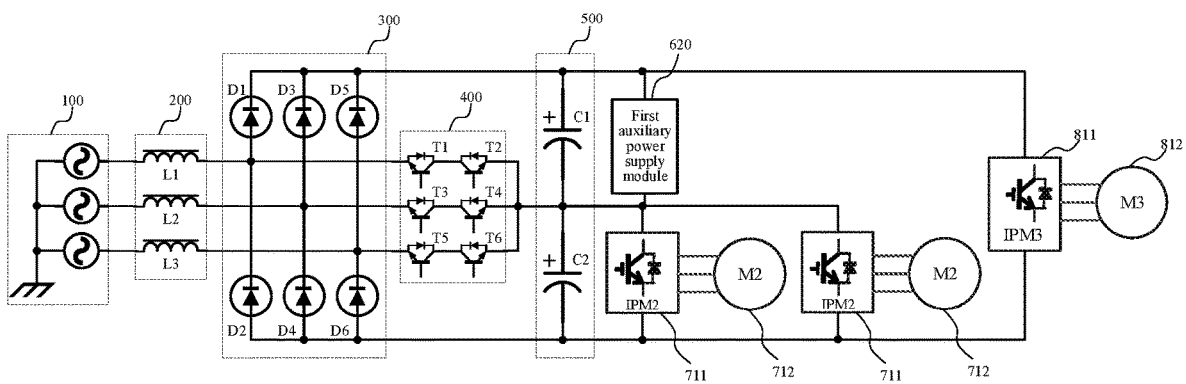
FIG. 22 is a topology diagram of a T-type three-level active PFC circuit with direct-current loads connected in parallel to an upper half bus and a lower half bus respectively provided by another embodiment of the present disclosure.

As shown in FIG. 22, the first capacitor C1 is connected in parallel with a first direct-current load 600, and the second capacitor C2 is connected in parallel with a second direct-current load 700. The first direct-current load 600 is a first auxiliary power supply module 620. The second direct-current load 700 includes two second fan modules, each second fan module includes a second direct-current fan 712 and a second driver assembly 711 configured for driving the second direct-current fan 712, and the second driver assembly 711 is connected in parallel to the second capacitor C2.

Figure 23:
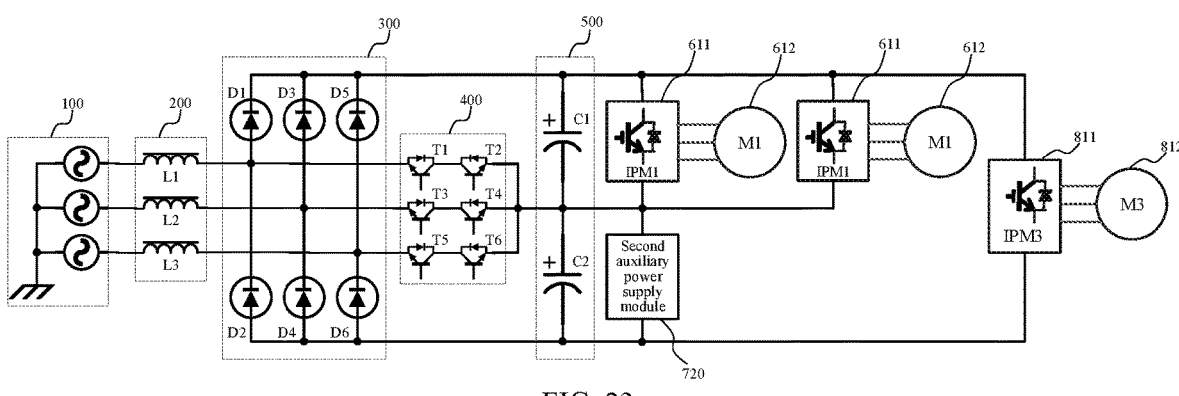
FIG. 23 is a topology diagram of a T-type three-level active PFC circuit with direct-current loads connected in parallel to an upper half bus and a lower half bus respectively provided by another embodiment of the present disclosure.

As shown in FIG. 23, the first capacitor C1 is connected in parallel with a first direct-current load 600, and the second capacitor C2 is connected in parallel with a second direct-current load 700. The first direct-current load 600 includes two first fan modules, each first fan module includes a first direct-current fan 612 and a first driver assembly 611 configured for driving the first direct-current fan 612, and the first driver assembly 611 is connected in parallel to the first capacitor C1. The second direct-current load 700 is a second auxiliary power supply module 720.

In an embodiment, numbers of the first fan module and the second fan module in the above embodiments are at least one.

In some embodiments, referring to FIG. 4 to FIG. 23, the electronic circuit of the embodiments of the present disclosure include, but is not limited to a third direct-current load 800, where the third direct-current load 800 is connected to the direct-current output end.

In an embodiment, the third direct-current load 800 includes a compressor 812 and a third driver assembly 811 configured for driving the compressor 812, and the third driver assembly 811 is connected to the direct-current output end.

In some embodiment, the first driver assembly 611, the second driver assembly 711 and the third driver assembly 811 can be IPM modules configured for driving the direct-current fan.

On the basis of the above-mentioned electronic circuit, various embodiments of the air conditioner according to the embodiments of the present disclosure are proposed below.

An embodiment of the present disclosure also provides an air conditioner, which includes the electronic circuit in any of the above embodiments.

Since the air conditioner according to the embodiments of the present disclosure includes the electronic circuit according to any of the embodiments above, the implementation and technical effects of the air conditioner according to the embodiments of the present disclosure refer to the implementation and technical effects of the electronic circuit of any of the above embodiments.

The foregoing describes some embodiments of the present disclosure in detail, but the present disclosure is not limited to the foregoing embodiments. Those having ordinary skill in the art can make various equal deformations or replacements without departing from the spirit of the present disclosure, and these equal deformations or replacements shall all fall within the scope limited by the claims of the present disclosure.

What is claimed is:

1. An electronic circuit comprising:
   a rectifier module including:
      a three-phase rectifier bridge including a first bridge arm, a second bridge arm, and a third bridge arm connected in parallel to each other; and
      a bidirectional switch assembly including:
         a first bidirectional switch, one end of the first bidirectional switch being connected to a midpoint of the first bridge arm;
         a second bidirectional switch, one end of the second bidirectional switch being connected to a midpoint of the second bridge arm; and
         a third bidirectional switch, one end of the third bidirectional switch being connected to a midpoint of the third bridge arm;
   an energy storage module connected to a direct-current output end of the rectifier module and including a first capacitor and a second capacitor connected in series to each other, the first capacitor being connected in parallel to an auxiliary power supply module and a first drive assembly, the first drive assembly being connected to and configured to drive a first direct-current fan, the second capacitor being connected in parallel to a second drive assembly, and the second drive assembly being connected to and configured to drive a second direct-current fan; and
   a third drive assembly connected to the direct-current output end of the rectifier module, and connected to and configured to drive a compressor;
   wherein another end of the first bidirectional switch, another end of the second bidirectional switch, and another end of the third bidirectional switch are connected between the first capacitor and the second capacitor.

2. The electronic circuit according to claim 1, wherein:

the direct-current output end includes a positive bus end and a negative bus end;

and the positive bus end is connected to the first capacitor and the negative bus end is connected to the second capacitor.

3. The electronic circuit according to claim 1, further comprising:

an inductance device; and an alternating-current input end connected to the rectifier module through the inductance device.

4. The electronic circuit according to claim 3, wherein:

the inductance device includes a first inductor, a second inductor, and a third inductor; and the alternating-current input end includes:

a first phase input end connected to the midpoint of the first bridge arm through the first inductor;

a second phase input end connected to the midpoint of the second bridge arm through the second inductor; and a third phase input end connected to the midpoint of the third bridge arm through the third inductor.

5. The electronic circuit according to claim 1, wherein each of the first bidirectional switch, the second bidirectional switch, and the third bidirectional switch includes two power switch transistors reversely connected in series to each other.

6. The electronic circuit according to claim 1, wherein:

each of the first bidirectional switch, the second bidirectional switch, and the third bidirectional switch includes two power switch transistors; and the two power switch transistors are reversely connected in parallel to each other, and are each reversely connected in parallel to a diode.

7. The electronic circuit according to claim 1, wherein each of the first bidirectional switch, the second bidirectional switch, and the third bidirectional switch includes a fourth bridge arm, a power switch transistor, and a fifth bridge arm connected in parallel to each other.

16

8. An air conditioner comprising:
an electronic circuit including:
   a rectifier module including:
      a three-phase rectifier bridge including a first bridge arm, a second bridge arm, and a third bridge arm connected in parallel to each other; and
      a bidirectional switch assembly including:
         a first bidirectional switch, one end of the first bidirectional switch being connected to a midpoint of the first bridge arm;
         a second bidirectional switch, one end of the second bidirectional switch being connected to a midpoint of the second bridge arm; and
         a third bidirectional switch, one end of the third bidirectional switch being connected to a midpoint of the third bridge arm;
   an energy storage module connected to a direct-current output end of the rectifier module and including a first capacitor and a second capacitor connected in series to each other, the first capacitor being connected in parallel to an auxiliary power supply module and a first drive assembly, the first drive assembly being connected to and configured to drive a first direct-current fan, the second capacitor being connected in parallel to a second drive assembly, and the second drive assembly being connected to and configured to drive a second direct-current fan; and
   a third drive assembly connected to the direct-current output end of the rectifier module, and connected to and configured to drive a compressor;
   wherein another end of the first bidirectional switch, another end of the second bidirectional switch, and another end of the third bidirectional switch are connected between the first capacitor and the second capacitor.

9. The air conditioner according to claim 8, wherein:
the direct-current output end includes a positive bus end and a negative bus end;
and
the positive bus end is connected to the first capacitor and the negative bus end is connected to the second capacitor.

10. The air conditioner according to claim 8, wherein the electronic circuit further includes:
an inductance device; and
an alternating-current input end connected to the rectifier module through the inductance device.

* * * * *